United States Patent Office 3,389,798
Patented June 25, 1968

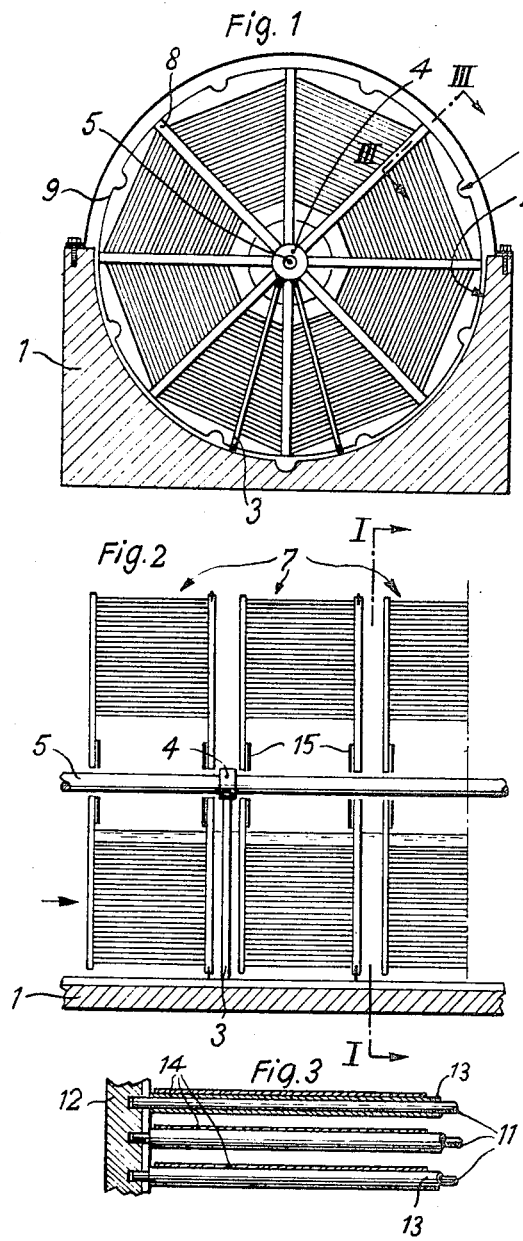

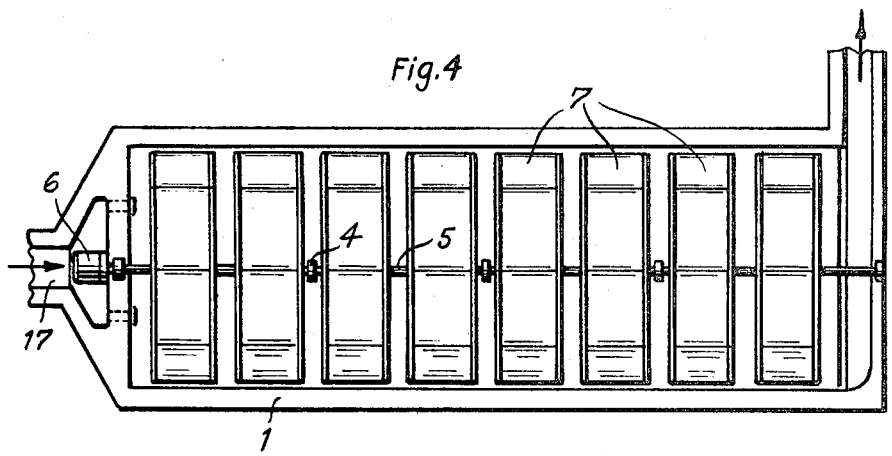
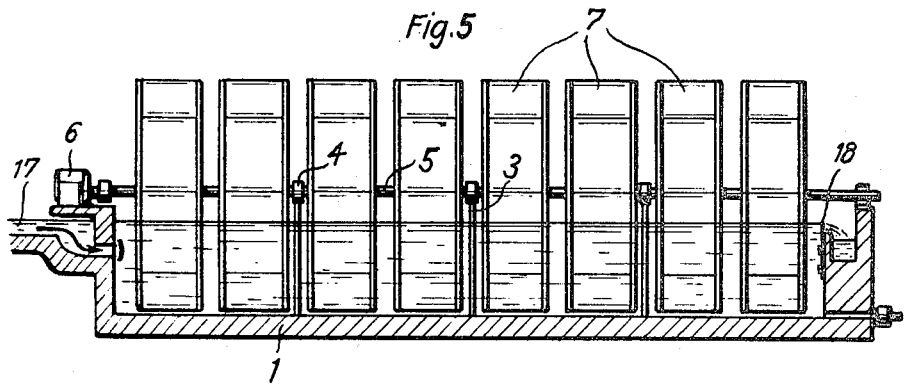

3,389,798
APPARATUS FOR THE BIOLOGICAL
PURIFICATION OF WASTE WATER
Hans Hartmann, Cadolzburgerstr. 14, Furth, Germany, and Johann Conrad Stengelin, Obere Vorstadt 21, Tuttlingen, Germany
Filed Nov. 4, 1966, Ser. No. 592,195
Claims priority, application Germany, Nov. 4, 1965, H 57,594
25 Claims. (Cl. 210—150)

The present invention relates to a method and apparatus for the biological purification of waste water using aerobic microorganisms. More particularly, the present invention concerns a rotatable immersion body which is at least partially immersed in a waste water tank for purifying said waste water, such that microorganisms are alternatively brought into forcible contact with atmospheric oxygen and the waste water or sewages to be treated.

In the art of biological treatment of waste water, for example, sewage, highly molecular organic compounds are oxidized to low molecular compounds by means of communities of aerobic microorganisms. This decomposition may be carried on until the chemical oxygen binding power of these substances is completely covered by forming inorganic compounds. Besides favorable environment conditions for the aerobic communities, sufficient oxygen must be available.

Several processes for the biological treatment of sewage waters are known. However, these processes suffer from many deficiencies, such as for example, the use of large quantities of bacteria in the form of activated sludge, and atmospheric oxygen in the form of compressed air. Some processes also require pumping plants to pump the sewage water, whereas others suffer from a build-up of biological fur which blocks up all flow passages, thus causing the whole body to be silted up completely. Thus, it is then necessary for the body to be frequently desludged by costly procedures.

Various types of biological purification systems are also well known in the art. However, these systems are generally difficult to construct, require components which are very expensive and difficult to transport, and/or cannot be adapted to the many requirements which are necessary in treating varying amounts and kinds of waste water.

It is therefore an object of the present invention to eliminate the disadvantages and shortcomings of the prior art purification systems and methods.

Another object of the present invention is to provide an improved method and apparatus for the biological purification of waste water using aerobic microorganisms.

A further object of the present invention is to provide a biological purification system comprising immersion bodies which can be readily assembled on the site from simply conveyable parts which are easily obtainable. The immersion bodies of the present invention can be effectively employed using a tank of simple construction and a small amount of driving power.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above mentioned disadvantages may be eliminated and a much improved biological purification system and process for purification can be obtained by adjusting the duration of contact of the microorganisms with air and with the waste water, for example, sewage, in accordance with the degree of contamination, by regulating the speed of a rotatable device which is in contact with said microorganisms. The rotatable device is partially immersed in the sewage so that the microorganisms can be exposed to the sewage to be treated as well as atmospheric oxygen until reaching the required degree of adsorption and until reception and release of a desired quantity of oxygen consumable during subsequent immersion. Furthermore, according to the present process, the thickness of the layer of the substance growing in the form of biological fur can grow only to a certain thickness, and the process can conveniently be conducted at such a speed that the individual phases in the course of the process are repeated at least within about two minutes.

More specifically, the present process provides for the biological treatment of waste water, for example, sewage effluent, by means of aerobic organisms, wherein an apparatus is provided for bringing microorganisms which grow on rotating surfaces alternately into contact with atmospheric oxygen and the sewage to be treated, so as to intensify oxidation. The duration of contact of the microorganisms with air and sewage is adjustable in accordance with the degree of pollution, by regulating the speed of a rotatable device partially immersed in the sewage in such a manner that the microorganisms are subjected to the sewage to be treated up to a desired degree of adsorption of adsorbable substance and also subjected to atmospheric oxygen until the reception and release of a desired quantity of oxygen consumable during the subsequent immersion. When the lowermost layers of the growing biological fur do not receive enough oxygen, they die and the pieces of this fur fall off from the surface and are withdrawn with the waste water. Thus, the thickness of layer of the substance growing in the form of biological fur or turf is permitted to grow only to a definite thickness.

The apparatus which is used to effectuate the process of the present invention comprises a system including a trough-shaped waste water tank containing a rotating shaft extending substantially the entire length of the trough in the longitudinal direction, said shaft containing radially oriented struts which are attached to the shaft and rotate with it. The struts extend radially from the shaft and are positioned on the shaft such that each strut is parallel with and faces another strut located along the shaft. Each set of facing struts are formed into pairs by connecting rods extending parallel to the shaft. A band extending around the shaft and positioned on the connecting rods forms a drum-shaped body with the struts. Advantageously, the band can be positioned to extend spirally from rod to rod, from the shaft to the outer surface of the drum. Furthermore, it is advantageous to arrange several immersion drums serially mounted on the shaft in a coaxial manner and spaced apart from one another.

Some of the advantages of the apparatus of the present invention are that the water flowing into the waste water tank can be distributed uniformly along the entire width of the immersed portion of the immersion bodies. Also, on a single, relatively long shaft, several immersion drums can be provided because the shaft can be supported at several locations, i.e., in the spaces between the individual immersion drums. Furthermore, the shaft containing the drums can be readily driven by only one motor of relatively small power to effect the desired purification of the present invention. A plant, using the apparatus of the present invention, is small in dimensions, contains low constructional and operating costs, has a large capacity, thus permitting a high decomposition of the contaminated portions to be obtained and a low nitrate content in the resulting discharge. Moreover, it is possible for the treatment of sewage to be interrupted at any period by stopping the plant which incidentally operates practically without maintenance.

The invention can be explained in greater detail with reference to the following drawings which are exemplary of the present invention.

FIGURE 1 shows a cross-section through the apparatus of the present invention along line I—I of FIGURE 2.

FIGURE 2 shows a longitudinal section through a portion of a trough-shaped waste water tank, according to the present invention.

FIGURE 3 is a section taken through a drum in front of a pair of struts along line III—III of FIGURE 1.

FIGURE 4 is a plane view of a waste water tank according to the present invention containing several immersion drums.

FIGURE 5 is a longitudinal view of the trough-shaped waste water tank of the present invention.

More specifically, the waste water purification apparatus of the present invention comprises a trough-shaped waste water tank 1 whose inner lining 2 has a semicircular configuration. A shaft 5 which extends the entire longitudinal length of the tank, is mounted in several bearings 4 which are attached to supporting arm 3. This shaft is rotatably disposed in the tank and communicates with a motor which is used to drive the shaft. The shaft can carry a number of immersion bodies or drums 7, such as for example, about 8, as shown in FIGURE 4, and these drums can be spaced apart from each other, for example, about 20 centimeters, to provide for positioning of the bearings and freedom of rotation.

Each immersion drum is provided with a number of pairs of struts, such as for example, eight pairs of struts as shown in FIGURE 1, which are directed radially from the center of the shaft to the periphery of the drum. The struts 8, are attached to bosses or hubs 15, which are in turn wedged onto the shaft. Each pair of struts has a large number of rods 11, for example, about tweny-four, connecting the opposite faces 12 of the individual struts with each other. Tubular sleeves 13 are positioned around a number of the connecting rods, thus insuring the desired spacing between the struts. These sleeves can be made of any material which is not attacked by the water to be treated, such as for example, plastic, brass or steel. The distance from one connecting rod to another connecting rod can be varied but is generally about 3 centimeters. The distance between the faces of parallel struts of the same pair can also be varied but is generally about 85 centimeters.

A broad band 14, composed of a flexible, waste water resistant plastic foil, can be placed on the connecting rods to correspond with the above-mentioned spacing, and attached in such a manner as to form an increasing spiral configuration from rod to rod from the center of the shaft to the periphery of the drum or alternatively, several bands can be used in an annular circumscribing arrangement. The band can have a smooth surface and can be made of any flexible, waste water resistant material.

Typical of the flexible plastic materials which can be used to produce the band are polyvinyl chloride foil and isocyanate polymers such as Perlon.

The struts and the internal diameter of the waste water tank are adapted to each other such that when the drums are rotating, the outermost strut edges are always spaced about 5 centimeters from the surface of the inner wall of the trough-shaped tank. Because the covering between two pairs of adjacent struts extends in a straight line, and the surface of the inner wall of the tank is of a circular configuration, there is created a circular chord segment between the immersion drum and the tank wall which rotates with the drum but is not part of the drum. This circular chord segment is covered by a plate 9 which has the same segmental configuration as the circular chord segment. This plate is provided between two respective adjacent struts of different strut pairs. This blocking plate or baffle is provided to prevent an excessive amount of stagnation or damming, and contains a recess 16 in the center of its periphery which is adapted to ambient flow conditions. Also, bypass conduits, not shown, can be provided for the waste water tank, through which a portion of the partially purified waste water can be recycled and again introduced into the waste water drum, preferably in front of the first immersion drum.

The waste water is fed to the trough-shaped tank at its front end, via inlet opens 17 which, during normal water level conditions, are located below the water surface in the tank. The water then flows through the serially connected immersion drums while the latter are slowly rotating, and leaves the trough-shaped tank through an exit weir 18, the height of which can be adjusted to permit control of the height of the waste water in the trough-shaped tank within predetermined limits and to maintain a constant water level.

The speed at which the immersion drums are driven by the motor 6 can be varied depending upon the degree of contamination in the waste water, but is generally adjusted to permit the drums to rotate about once every two minutes. It is apparent that the drive does not have to mounted at the front end of the tank as illustrated in the drawings, but rather can engage the shaft at any desired location where no immersion drum is attached.

The waste water tank of the present invention can be covered by a roof which is made of transparent, rigid plastic material, and which in many cases is semicircular to conform to the shape of the exposed portions of the drums. This covering can also consist of several sections arranged across the length of the trough-shaped tank, wherein one of the sections can easily be detached and removed, if necessary, for example, for varying the ventilating conditions. If the covering of the tank is of one piece, it is not possible to partially ventilate the tank as when the covering is made of sections. In this situation, it is possible to ventilate only from the front end portion of the tank, and thus it is advantageous to provide a ventilator at at least one end of the tank.

The apparatus of the present invention, as described in the above embodiment, is particularly advantageous in that it can be adapted within wide limits to accommodate the quality of the waste water to be purified, the quantity of the waste water to be purified, and the desired purification efficiency. This can be accomplished by appropriately selecting the speed of rotation, the length of the tank and consequently the number of immersion drums, as well as the selection of the desired diameter of these drums. In this connection, there are no problems in manufacturing large drums, because they can be easily constructed and can be assembled on the same site where they will be used. Therefore, the apparatus of the present invention can be adapted to any desired requirements, for example, by providing additional power to accommodate a long large tank. In some situations it may also be advantageous to connect several tanks in series and to interpose between these tanks intermediate settling troughs, and also to provide in conjunction therewith, a partial recycling of the waste water.

In accordance with the method of the present invention, the waste water to be treated is introduced into a tank containing a number of rotating drums and flows slowly therethrough so that biological turf can attach itself to the slowly moving surfaces. The water to be treated contacts the biological turf growing on the plastic foil. The microorganisms contained in this turf, stemming from the waste water itself, reproduce, this reproduction being enhanced by the atmospheric oxygen fed thereto. By re-immersion into the water, the turf layer can thicken. The lower-most portions of the layer then die when the layer has become thick enough. The turf layer then loses its hold and falls, as muck, into the trough-shaped container. From there, the muck is rinsed out and caused to settle in the subsequent post-settling vessel.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. An apparatus for the biological purification of waste water which comprises a tank, at least one immersion drum element longitudinally and rotatably disposed within said tank such that a portion of the drum element extends above the water level of the tank, said drum element being disposed on a longitudinal shaft within the tank and comprising pairs of struts directed radially from the shaft, said pairs being connected to each other by connecting rods disposed substantially parallel to the shaft, at least one band extending a distance from and around the shaft and placed on the connecting rods to form together with said struts a drum-shaped body, means for rotating the drum elements within the tank, inlet means for introducing the water to be treated into the tank and means for removing the purified water from the tank.

2. The apparatus of claim 1, wherein the rods are provided in such a manner that the band positioned thereon and attached thereto extends in an increasing and substantially spirally manner about the shaft, from the shaft to the periphery of the drum.

3. The apparatus of claim 1, wherein the rods are provided in such a manner that the bands positioned thereon and attached thereto are arranged in an annular circumscribing manner.

4. The apparatus of claim 1, wherein spacer tubes are placed around at least one rod connecting a pair of struts, said tubes together with said rod forming a spacer bolt.

5. The apparatus of claim 1, wherein several immersion drums are coaxially provided on said shaft in series arrangement.

6. The apparatus of claim 1, wherein a support mounting for the shaft is provided on at least one section of the shaft which does not have an immersion drum positioned thereon.

7. The apparatus of claim 1, wherein the inlet for the waste water is provided below the normal water level of the tank.

8. The apparatus of claim 1, wherein the inner surface of the wall of the tank is positioned a short distance from the ends of the struts.

9. The apparatus of claim 1, wherein at least one by-pass-type backflow channel is provided to permit recycling of part of the waste water which has already been partially purified.

10. The apparatus of claim 1, wherein a height-adjustable weir is provided at the end of the waste water tank.

11. The apparatus of claim 1, wherein several waste water tanks are conencted in series.

12. The apparatus of claim 1, wherein intermediate settling troughs are provided between the individual waste water tanks.

13. The apparatus of claim 1, wherein the band is a flexible plastic material which is resistant to waste water.

14. The apparatus of claim 13, wherein the flexible plastic material is a polyurethane or polyvinyl chloride.

15. The apparatus of claim 1, wherein blocking plates cover the free space between the drum body and the wall of the tank.

16. The apparatus of claim 15, wherein the blocking plates are provided with small recesses at their periphery.

17. The apparatus of claim 1, wherein the speed of rotation of the immersion drums is adjustable to correspond with the degree of contamination of the waste water.

18. The apparatus of claim 17, wherein the speed of rotation of the immersion drums is controlled to rotate no more than about once every two minutes.

19. The apparatus of claim 1, wherein at least part of the waste water tank is covered by a transparent synthetic material.

20. The apparatus of claim 19, wherein a ventilator is provided at one end of the waste water tank.

21. The apparatus of claim 1, wherein the immersion drum element contains microorganisms growing on the surfaces thereof, said microorganisms being alternately brought in contact with atmospheric oxygen and waste water.

22. The apparatus of claim 21, wherein the rotation of the immersion drum is regulated in accordance with the degree of pollution of the waste water.

23. The apparatus of claim 22, wherein the rotation of the immersion drum is regulated such that the microorganisms are subjected to the waste water to be treated up to a desired degree of absorption and also subjected to atmospheric oxygen until the reception and release of a desired quantity of oxygen consumable during the subsequent immersion.

24. The apparatus of claim 21, wherein the thickness of the microorganisms growing in the form of biological fur is permitted to grow only to a definite thickness.

25. The apparatus of claim 24, wherein the microorganisms contained in the biological fur stem from the waste water itself.

References Cited

UNITED STATES PATENTS 1,811,181   6/1931   Maltby _____ 210—17 X
2,559,704   7/1951   Bevan _____ 210—11

MICHAEL E. ROGERS, *Primary Examiner.*